(12) United States Patent
Harris

(10) Patent No.: US 9,144,244 B1
(45) Date of Patent: Sep. 29, 2015

(54) GREASE SHIELD SMOKE ASSEMBLY

(71) Applicant: James C. Harris, Bahama, NC (US)

(72) Inventor: James C. Harris, Bahama, NC (US)

( * ) Notice: Subject to any disclaimer, the term of this patent is extended or adjusted under 35 U.S.C. 154(b) by 0 days.

(21) Appl. No.: 13/866,570

(22) Filed: Apr. 19, 2013

(51) Int. Cl.
*A47J 37/00* (2006.01)
*A23B 4/052* (2006.01)
*F24C 15/22* (2006.01)
*F24C 15/24* (2006.01)

(52) U.S. Cl.
CPC .............. *A23B 4/0526* (2013.01); *F24C 15/22* (2013.01); *F24C 15/24* (2013.01)

(58) Field of Classification Search
CPC .......... F24C 15/22; F24C 15/24; F24C 3/042; F24C 3/047
USPC ................... 99/401, 400, 447, 446, 645, 482; 126/383.1, 384.1, 299 C; 220/369, 731
See application file for complete search history.

(56) References Cited

U.S. PATENT DOCUMENTS

| | | | |
|---|---|---|---|
| 3,062,127 A * | 11/1962 | Lang ................................ 99/393 |
| 4,377,109 A * | 3/1983 | Brown et al. .................... 99/401 |
| 4,454,805 A * | 6/1984 | Matthews ........................ 99/400 |
| 4,857,074 A | 8/1989 | Crace |
| 4,951,648 A * | 8/1990 | Shukla et al. ............... 126/21 A |
| 5,427,805 A | 6/1995 | Crace |
| 5,481,965 A | 1/1996 | Kronman |
| 5,536,518 A * | 7/1996 | Rummel ........................ 426/523 |
| 5,551,332 A * | 9/1996 | Beatty ............................. 99/446 |
| D383,356 S | 9/1997 | Stuck |
| 6,059,849 A | 5/2000 | Lewis |
| 6,273,922 B1 | 8/2001 | Funk et al. |
| 6,523,461 B1 | 2/2003 | Johnston et al. |
| D649,511 S | 11/2011 | Christensen et al. |
| 2001/0035100 A1 * | 11/2001 | Witzel ............................ 99/444 |

* cited by examiner

*Primary Examiner* — Reginald L Alexander

(57) ABSTRACT

A grease shield smoke assembly provides smoke to flavor food grilled in a gas grill. The assembly includes a shield having a pair of planar side portions to replace the existing grease shield of the gas grill. Proximal edges of the side portions are coupled together defining an apex of the shield. Distal edges of the side portions relative to the apex are positioned in spaced relationship. Each of a pair of rails is coupled to and extends from an associated one of the side portions. The rails are positioned in alignment extending along the shield between the side portions. A rack is provided having lateral edges. The lateral edges of the rack are supported on the rails wherein the rack is supported between the side portions of the shield. Briquettes to produce smoke may be positioned on the rack.

8 Claims, 4 Drawing Sheets

GREASE SHIELD SMOKE ASSEMBLY

BACKGROUND OF THE DISCLOSURE

Field of the Disclosure

The disclosure relates to grilling devices and more particularly pertains to a new grilling device for providing smoke to flavor food grilled in a gas grill.

SUMMARY OF THE DISCLOSURE

An embodiment of the disclosure meets the needs presented above by generally comprising a shield having a pair of planar side portions. Proximal edges of the side portions are coupled together defining an apex of the shield. Distal edges of the side portions relative to the apex are positioned in spaced relationship. Each of a pair of rails is coupled to and extends from an associated one of the side portions. The rails are positioned in alignment extending along the shield between the side portions. A rack is provided having lateral edges. The lateral edges of the rack are supported on the rails wherein the rack is supported between the side portions of the shield.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
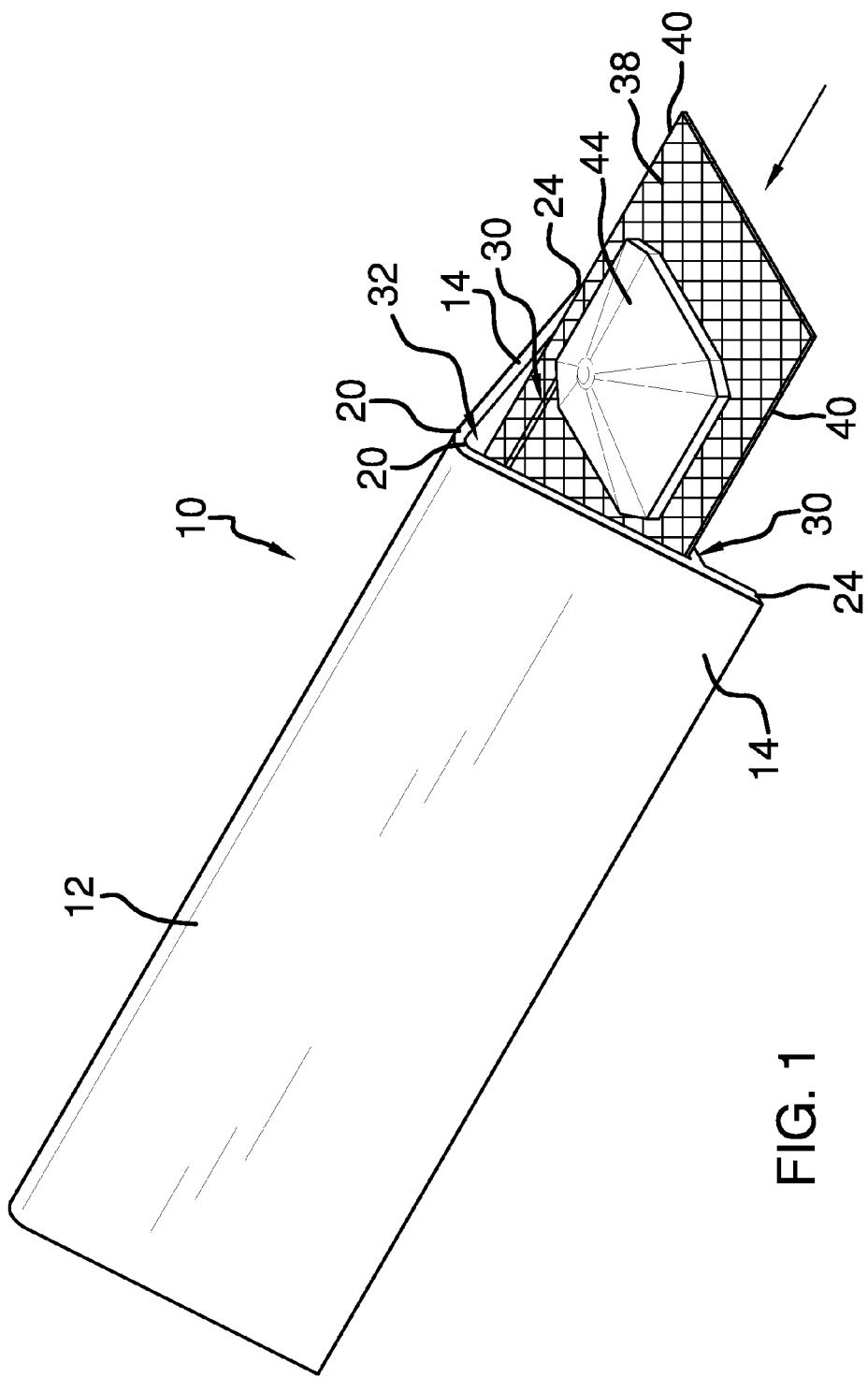
FIG. 1 is a top front side perspective view of a grease shield smoke assembly according to an embodiment of the disclosure.
Figure 2:
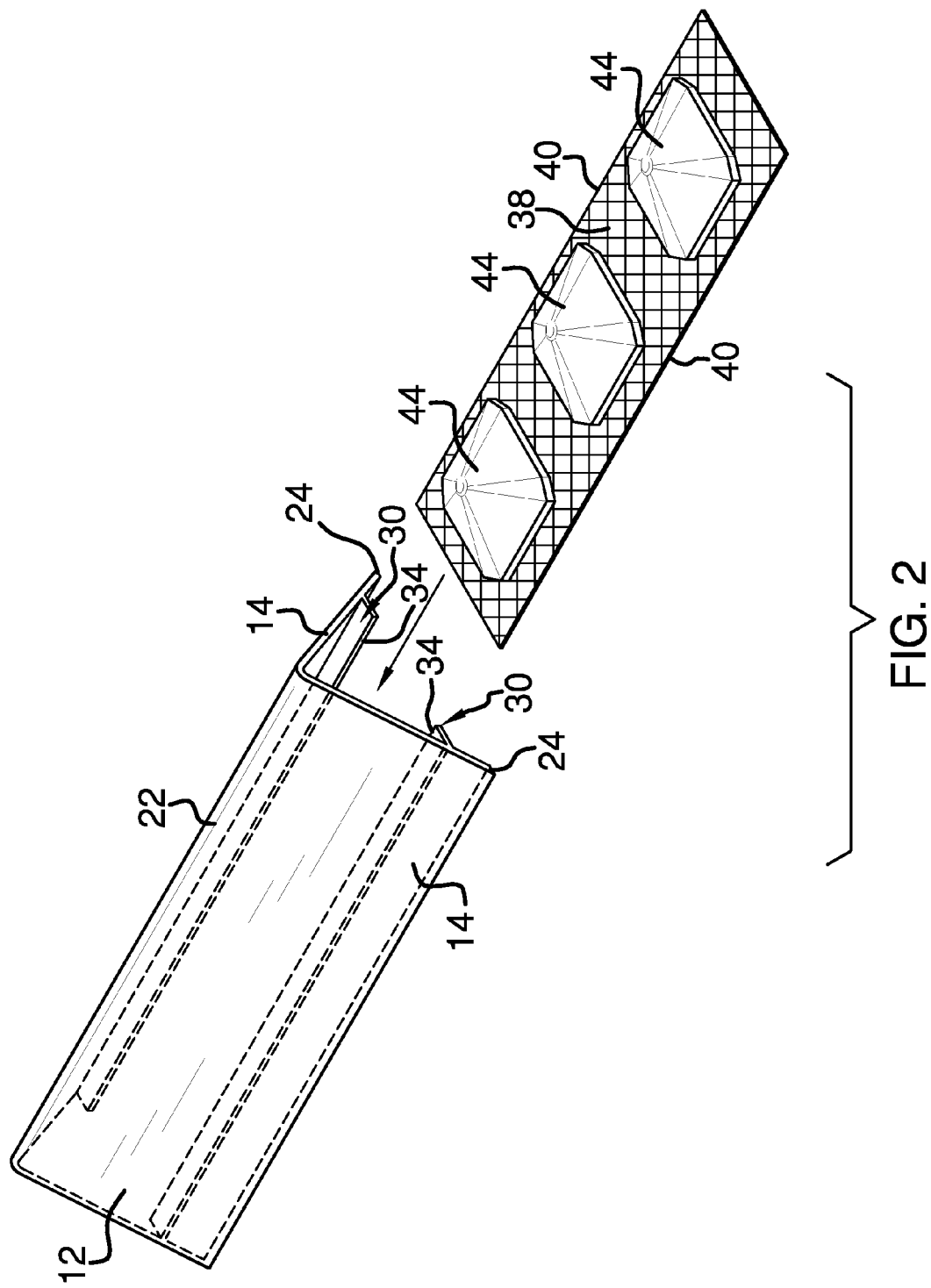
FIG. 2 is a partially exploded top front side perspective view of an embodiment of the disclosure.
Figure 3:
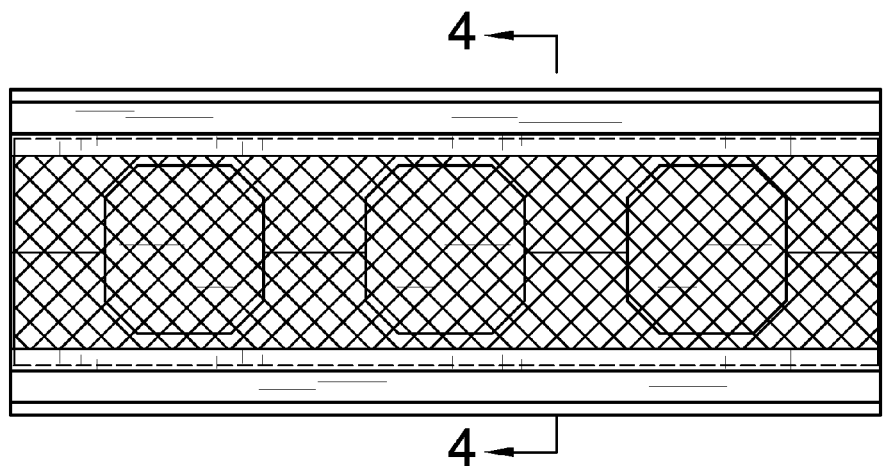
FIG. 3 is a bottom view of an embodiment of the disclosure.
Figure 4:
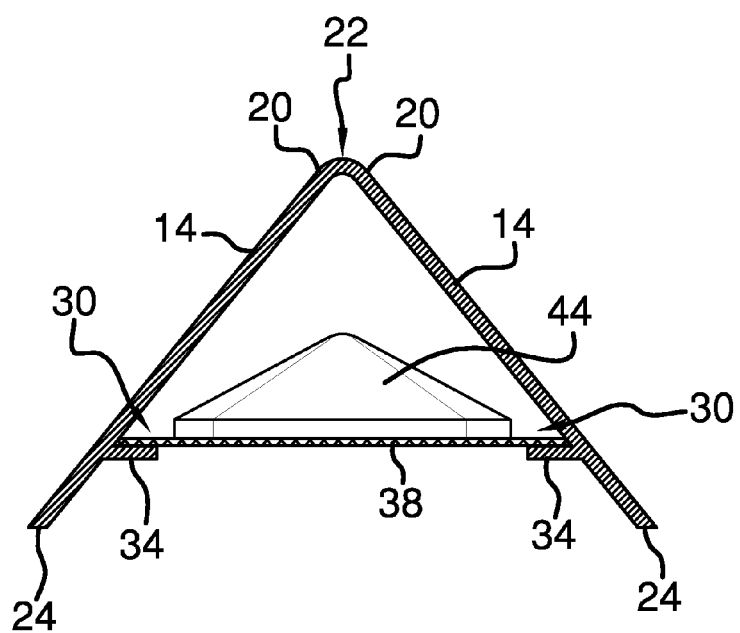
FIG. 4 is a cross-sectional view of an embodiment of the disclosure taken along line 4-4 of FIG. 3.
Figure 5:
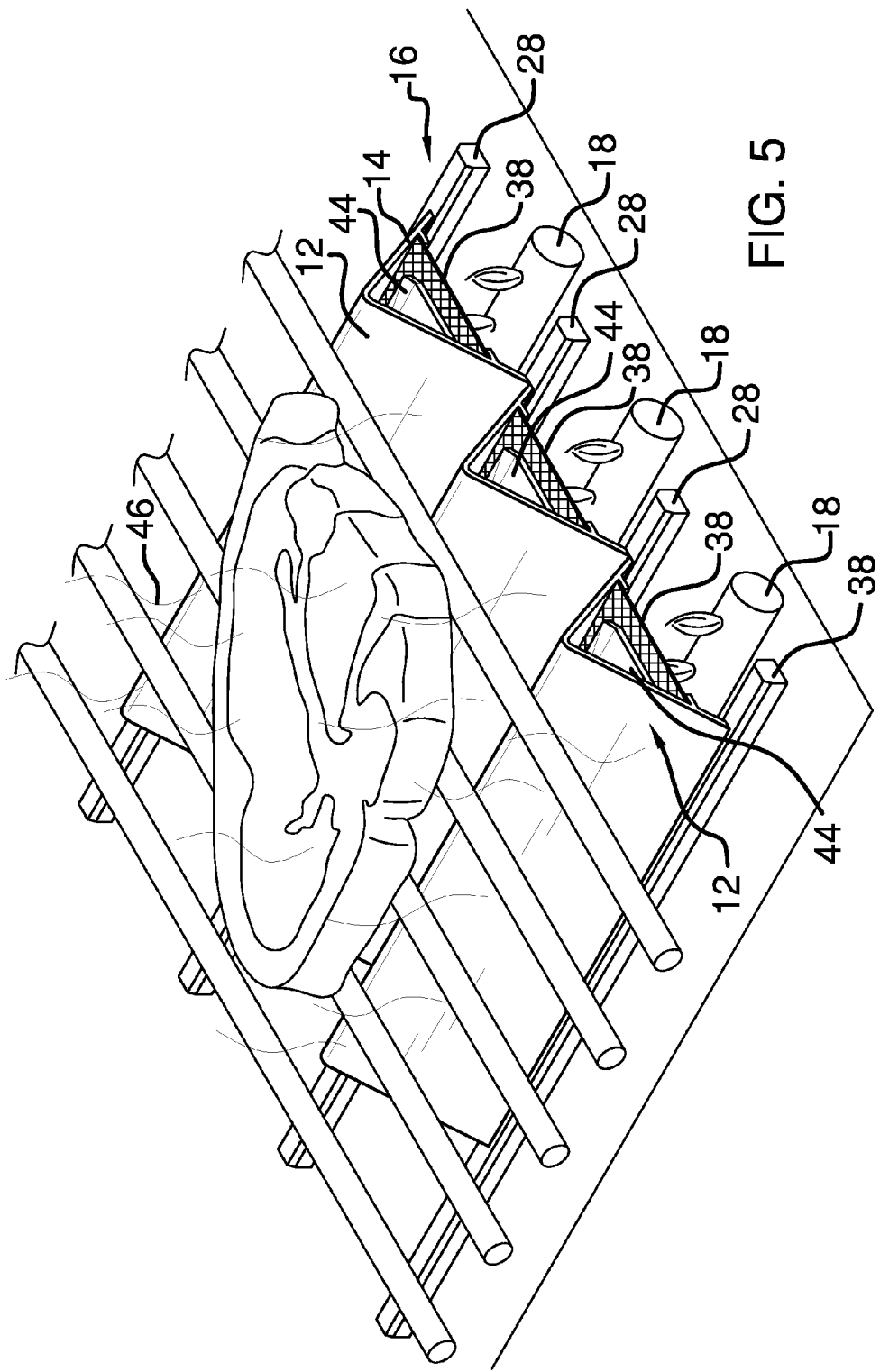
FIG. 5 is a top front side perspective view of an embodiment of the disclosure in use.

With reference now to the drawings, and in particular to FIGS. 1 through 5 thereof, a new grilling device embodying the principles and concepts of an embodiment of the disclosure and generally designated by the reference numeral 10 will be described.

As best illustrated in FIGS. 1 through 5, the grease shield smoke assembly 10 generally comprises a shield 12 having a pair of planar side portions 14 of the type commonly used in a gas grill 16 to shield burners 18 from grease. Proximal edges 20 of the side portions 14 are coupled together defining an apex 22 of the shield 12 extending along a length of the shield 12. Distal edges 24 of the side portions 14 relative to the apex 22 are positioned in spaced relationship and are coplanar to sit on supports 28 in the grill 16 positioning the shield 12 over a burner 18. A pair of rails 30 is provided. Each rail 30 is coupled to and extends from an inward face 32 of an associated one of the side portions 14 of the shield 12. The rails 30 are positioned in alignment extending along the shield 12 between the side portions 14. The rails 30 are coplanar flanges 34 extending from each associated one of the side portions 14. Each rail 30 extends a full length of the associated side portion 14 of the shield 12. A meshed wire rack 38 has lateral edges 40 supported on the rails 30 wherein the rack 38 is supported between the side portions 14 of the shield 12 and over the burner 18. The rack 38 may have a length equal to a length of the shield 12 wherein the rack 38 extends a full length of the shield 12 when the rack 38 is fully inserted between the side portions 14 and supported on the rails 30.

A plurality of permanent briquettes 44 are provided. Each briquette 44 is positioned on the rack 38 directly over the burner 18. Each briquette 44 is saturated with a liquid smoke composition as is known in grilling for imparting smoke flavor to food. Thus, each briquette 44 is configured to produce smoke 46 when the shield 12 is positioned in the gas grill 16 such that the gas grill 16 heats the briquettes 44. Alternatively, other types of known smoke producing briquettes may be similarly positioned on the rack 38. The briquettes 44 may rest on the rack 38 or be coupled to the rack 38 to maintain spacing along a length of the rack 38. When using briquettes 44 coupled to the rack 38, a plurality of racks 38 may be used with briquettes 44 having a particular smoke flavor such as applewood, hickory, mesquite and other known types commonly used in grilling. The racks 38 may be interchanged in the shield 12 for producing a desired flavor in the food being grilled. Multiple shields 12 may be employed while grilling allowing production of smoke of a single flavor or a combination of flavors by mixing racks 38 having different associated flavors of smoke.

In use, the existing grease shield bars in the gas grill 16 are replaced by shields 12 and racks 38 positioned on the rails 30. The desired briquettes 44 are used with the racks 38 to produce the desired smoke flavor for the food being grilled.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A grease shield smoke assembly comprising:
   a shield having a pair of planar side portions, proximal edges of said side portions being coupled together defining an apex of said shield, distal edges of said side portions relative to said apex being positioned in spaced relationship;
   a pair of rails, each rails being coupled to and extending from an associated one of said side portions, said rails being positioned in alignment extending along said shield between said side portions; and
   a rack having lateral edges, said lateral edges of said rack being supported on said rails wherein said rack is supported between said side portions of said shield; and
   a briquette positioned on said rack wherein said briquette is configured to produce smoke when said shield is positioned in a gas grill.

2. The assembly of claim 1, further comprising said briquette being permanent.

3. The assembly of claim 1, further comprising said briquette being saturated with a liquid smoke composition.

4. The assembly of claim 2, further comprising said briquette being saturated with a liquid smoke composition.

5. The assembly of claim 1, further comprising said rack being a meshed wire.

6. The assembly of claim 1, further comprising said rails being coplanar flanges extending from each said associated one of said side portions.

7. A grease shield smoke assembly comprising:
   a shield having a pair of planar side portions, proximal edges of said side portions being coupled together defining an apex of said shield, distal edges of said side portions relative to said apex being positioned in spaced relationship;
   a pair of rails, each rails being coupled to and extending from an associated one of said side portions, said rails being positioned in alignment extending along said shield between said side portions;
   a rack having lateral edges, said lateral edges of said rack being supported on said rails wherein said rack is supported between said side portions of said shield; and
   a plurality of permanent briquettes, each briquette being positioned on said rack, each said briquette being saturated with a liquid smoke composition wherein each said briquette is configured to produce smoke when said shield is positioned in a gas grill such that the gas grill heats said briquettes.

8. A grease shield smoke assembly comprising:
   a shield having a pair of planar side portions, proximal edges of said side portions being coupled together defining an apex of said shield, distal edges of said side portions relative to said apex being positioned in spaced relationship;
   a pair of rails, each rails being coupled to and extending from an associated one of said side portions, said rails being positioned in alignment extending along said shield between said side portions, said rails being coplanar flanges extending from each said associated one of said side portions, each said rail extending a full length of said associated side portion of said shield;
   a meshed wire rack having lateral edges, said lateral edges of said rack being supported on said rails wherein said rack is supported between said side portions of said shield, said rack extending a full length of said shield when said rack is fully inserted between said side portions and supported on said rails; and
   a plurality of permanent briquettes, each briquette being positioned on said rack, each said briquette being saturated with a liquid smoke composition wherein each said briquette is configured to produce smoke when said shield is positioned in a gas grill such that the gas grill heats said briquettes.

* * * * *